United States Patent Office 3,502,717
Patented Mar. 24, 1970

3,502,717
2-ARYLTHIO AND 2-ARYLSULFONYL
BENZOIC ACID
Joseph G. Lombardino, Niantic, Conn., assignor to Chas. Pfizer & Co., Inc., New York, N.Y., a corporation of Delaware
No Drawing. Filed May 2, 1967, Ser. No. 635,406
Int. Cl. C07c 149/20
U.S. Cl. 260—516     3 Claims

ABSTRACT OF THE DISCLOSURE

Compounds having the formulae

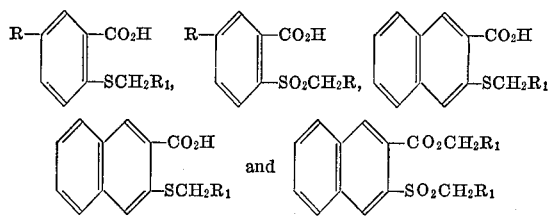

wherein R is selected from the group consisting of $-CF_3$ and $NO_2$, and $R_1$ is selected from the group consisting of phenyl, tolyl, methoxyphenyl, nitrophenyl, halophenyl, trifluoromethyl phenyl, trifluoromethyl-thiophenyl, trifluoromethyl-sulfinylphenyl, trifluoromethylsulfonylphenyl and α- or β-naphthyl are prepared. These compounds of useful intermediates in the preparation of 2-arylbenzo(b)-thiophen - 3(2H)-one - 1,1-dioxides and 2-arylnaphtho(2,3-b) thiophen - 3(2H) - one - 1,1-dioxides which have utility as anti-inflammatory agents in the treatment of arthritic disorders.

BACKGROUND OF THE INVENTION

This invention relates to a series of novel derivatives of 2-arylbenzo(b)thiophen - 3(2H)-one - 1,1-dioxides and the novel class of 2-arylnaphtho(2,3-b)thiophen-3(2H)-one-1,1-dioxides. These compounds have the general structural formulas:

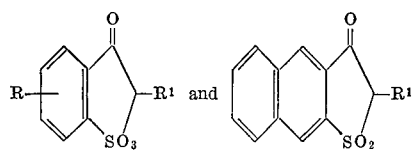

wherein:

R may be $CF_3$, $CH_3$, and $NO_2$; and
$R^1$ may be phenyl, tolyl, methoxyphenyl, nitrophenyl, halophenyl, trifluoromethylphenyl, trifluoromethylthiophenyl, trifluoromethylsulfinylphenyl, trifluoromethylsulfonylphenyl, and α- and β-naphthyl.

These compounds can also exist, particularly in solution, in the respective tautomeric formulas, viz.

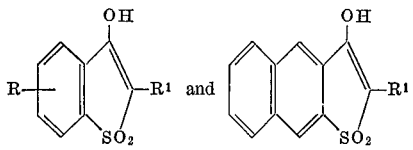

Thus, while for convenience we represent these compounds as having the keto rather than the enol structure, we wish it to be understood that we do not restrict ourselves to only adopting these structures, since under certain conditions these compounds may exist wholly in either form or alternatively, may consist of an equilibrium mixture of both species. Indeed we have found that in various solvents these compounds may exist predominately in either the keto or enol form.

Although the parent compound, 2-phenylbenzo(b)thiophen-3(2H)-one-1,1-dioxide (R=H; $R^1$=phenyl), as well as a limited number of 2-(substituted-phenyl)benzo(b)thiophen - 3(2H)-one - 1,1-dioxides (R=H; $R^1$=substituted-phenyl) have been reported before, the 2-arylbenzo(b)thiophen-3(2H)-one-1,1-dioxides of the present invention have now been prepared for the first time. The related 2-arylnaphtho(2,3-b)thiophen-3(2H) - one - 1,1-dioxides described herein represent a completely new series of compounds.

We have surprisingly and unexpectedly discovered that the compounds of the present invention, and of the entire series in general, exhibit a high degree of anti-inflammatory activity in mammals, and are effective in preventing and inhibiting the formation of granulomatous tissue. Consequently, these compounds are of value in the treatment of arthritic disorders which are responsive to treatment with anti-inflammatory agents.

Although the 2-arylbenzo(b)thiophen-3(2H)-one - 1,1-dioxides as a group possess anti-inflammatory activity, those compounds of the series which are unsubstituted in the benzo(b) ring, i.e., R=H, have the serious disadvantage of being anticoagulins; in particular, they inhibit prothrombin synthesis in mammals and prolong or prevent blood coagulation. Thus, the parent compound, wherein R=H, $R^1$=phenyl, and the few known compounds in the series wherein R=H, and $R^1$=substituted phenyl possess this undesirable side effect. We have surprisingly found that this undesirable property can be readily eliminated from the series by introducing suitable substituents into the benzo(b) ring.

It has also been discovered that while possessing anti-inflammatory activity, the novel 2-arylnaphtho(2,3,-b)thiophen-3(2H)-one-1,1-dioxides do not cause any of the detrimental blood coagulating defects.

SUMMARY OF THE INVENTION

This invention comprises the preparation of compounds having the formula:

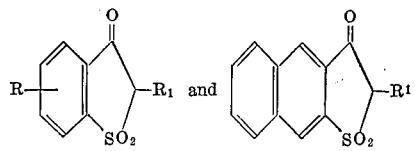

wherein $R^1$ may be phenyl, tolyl, methoxyphenyl, nitrophenyl, halophenyl, trifluoromethylphenyl, trifluoromethylsulfonylphenyl, and α- and β-naphthyl, and their use in mammals for alleviating arthritic and like-conditions that are responsive to treatment with anti-inflammatory agents. As previously mentioned, the compounds of the present invention have the advantage of possessing anti-inflammatory activity while at the same time avoiding the undesirable property of inhibiting blood coagulation in mammals, which side effect is shown by the previously known 2-arylbenzo(b)thiophen-3(2H)-one-1,1-dioxides.

Thus, it is an object of this invention to prepare suitable benzo(b)thiophen-3(2H)-one-1, 1 - dioxides which show anti-inflammatory activity in mammals, but do not inhibit blood coagulation.

This objective has been successfully realized by introducing suitable substituents into the benzo(b) ring of the 2-arylbenzo(b)thiophen-3(2H)-one-1, 1-dioxides.

This invention also comprises the preparation of the related novel series of 2-arylnaphtho(2,3 - b)thiophen - 3 (2H)-one-1,1-dioxides which have the desired property of exhibiting anti-inflammatory activity without the undesirable side effects mentioned above.

DETAILED DESCRIPTION OF THE INVENTION

The compounds of the present invention can be conveniently prepared by several, independent procedures, which are outlined below in Charts 1 to 3.

In the procedure illustrated in Chart 1, an appropriately substituted benylmercaptan is converted to its alkali metal benzylmercaptide, and reacted either with a chlorobenzonitrile (Chart 1, step $a$) or a chlorobenzoic acid (Chart 1, step $a'$).

CHART 1

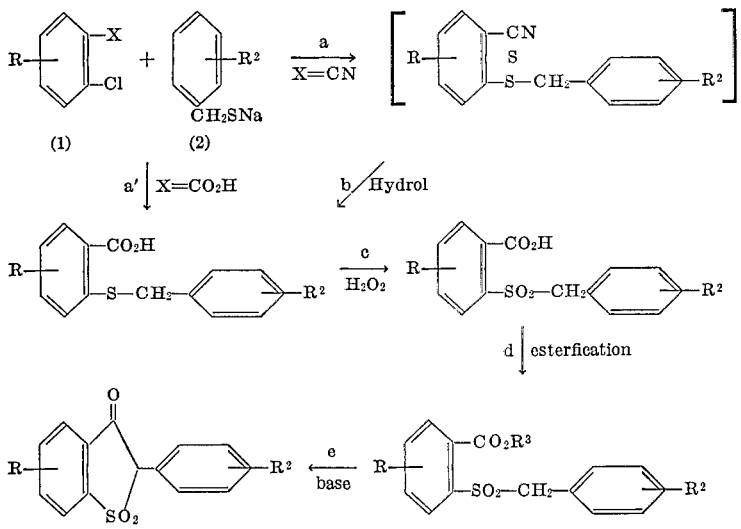

$R = -CH_3, -CF_3, -NO_2$
$R^2 = -CH_3, -OCH_3, -NO_2, F, Cl, Br, -CF_3, CF_3SO_2-$
$R^3 = $ lower alkyl (1)

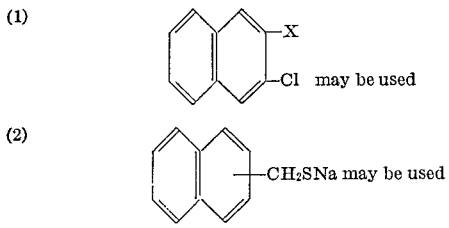

-Cl  may be used (2)

-CH₂SNa may be used

When a chlorobenzonitrile is used as a precursor (step $a$), the benzylmercaptide is usually prepared by treating the benzylmercaptan with an alkali metal alkoxide in a lower alkanol, e.g., sodium ethoxide in ethanol.

The alkali metal benzylmercaptide is isolated and dissolved in anhydrous dimethylformamide.

To this solution is then added the appropriately substituted 2-chlorobenzonitrile (Chart 1, step $a$). After stirring the reaction mixture at room temperature to complete the reaction, it is poured into water, and the crude substituted 2-benzylthiobenzonitrile is extracted with a suitable solvent, generally ether. The solvent is evaporated and the crude product is hydrolyzed (Chart 1, step $a$) by refluxing it in an aqueous sodium hydroxide solution, containing a small amount of ethanol. After evaporation of the ethanol, the residual oil is extracted with ether. Evaporation of the ether provides an oil, which is suspended in water. The aqueous suspension is acidified and the substituted 2-benzylthiobenzoic acid which separates is collected.

Rather than employing the 2-chlorobenzonitriles as precursors, one can also conveniently use substituted 2-chlorobenzoic acids, e.g. see Chart 1, step $a'$. In this case the appropriately substituted 2-chlorobenzoic acid is heated for several hours with a benzylmercaptan and a strong base, such as potassium hydroxide or sodium hydroxide, and a small amount of copper powder. The reaction mixture is cooled, filtered, and diluted with mineral acid and the substituted 2-benzylthiobenzoic acid is isolated. The 2-benzylthiobenzoic acids are conveniently oxidized to the corresponding 2-benzylthiobenzoic acids with 30% hydrogen peroxide in either glacial acetic or formic acid (Chart 1, step $c$).

The substituted 2-benzylsulfonylbenzoic acids are then converted to a lower alkyl ester by any one of several methods.

One method is to reflux the acid in a lower alkanol that is saturated with hydrogen chloride, and then allow the mixture to stand at room temperature for several days. The ester is then isolated from the reaction mixture by procedures well known to those skilled in the art.

Alternatively, the acid can be reacted with thionyl chloride in benzene, to give the respective acid chloride, which is then reacted with a suitable lower alkanol to afford the related ester (step $d$ of Chart 1). Generally the ester is not isolated and purified, but is directly converted to the desired compounds of the present invention (Chart 1, step $e$). The esters can be readily cyclized to the desired compound, by treatment with an appropirate base. We prefer to use an alkali metal alkoxide in a lower alkanol, e.g., sodium ethoxide in ethanol. After refluxing the ester in this mixture, the solvent is removed and the residue is diluted with water. The resulting mixture is acidified with a strong mineral acid and the 2-arylbenzo(b)thiophen-3(2H)-one-1,1-dioxide that separates is isolated and purified by conventional procedures.

In addition to this method, we have developed another procedure for the preparation of the 2-arylbenzo(b)thiophen-3(2H)-one-1,1-dioxides from the corresponding esters shown in Chart I. This method comprises refluxing the ester with a small amount of potassium acetate in acetic anhydride. After the solvents are removed under reduced pressure, the acetate of the enol of the 2-arylbenzo(b)thiophen-3(2H) - one - 1,1 - dioxide is obtained which is readily converted to the desired thiophen-3(2H)-one-1,1-dioxide by hydrolysis with sodium hydroxide. It must be realized that the related 2-arylnaphtho(2,3-b)thiophen-3(2H)-one-1,1-dioxide can also be prepared by the above process.

An alternate synthetic route to the desired compounds of the present invention is outlined in Chart 2.

CHART 2

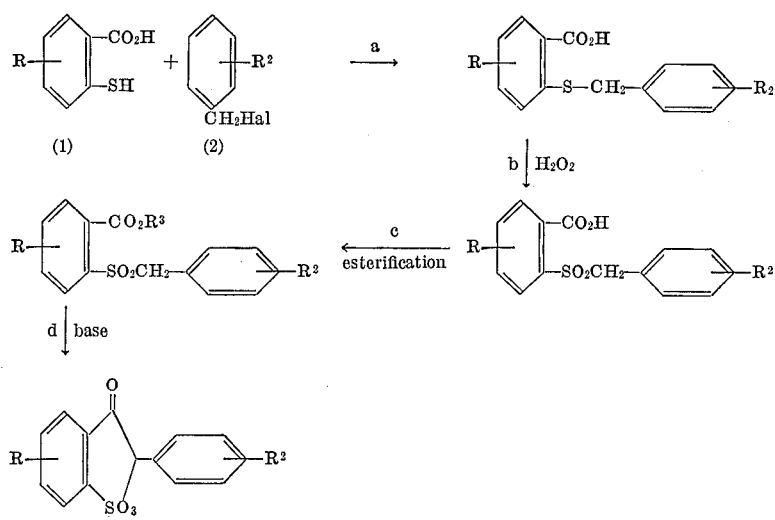

Hal = Br, Cl
R = —CH₃, —CF₃, —NO₂
R² = —CH₃, —OCH₃, —MO₂, F, Cl, Br, —CF₃, CF₃SO₂—
R³ = lower alkyl (1) 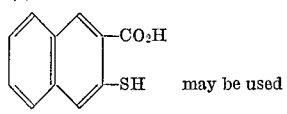 may be used (2) 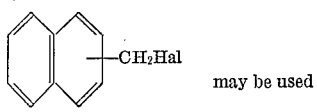 may be used In the process outlined in Chart 2, one reacts a substituted 2-mercaptobenzoic acid with a substituted benzyl halide in an alkaline, lower alkanol-water mixture. Generally, we prefer to use sodium carbonate as the alkali. After heating the mixture for a short time, the major portion of the solvent is evaporated and the residue diluted with water. Acidification with dilute mineral acid results in the separation of the desired substituted 2-benzylthiobenzoic acid, which is then converted into the respective 2-arylbenzo(b)thiophen-3(2H)-one-1,1-dioxide (Chart 2, steps b to d) by the procedures described above for the process outlined in Chart 1.

The substituted 2-arylnaphtho(2,3-b)thiophen - 3(2H)-one-1,1-dioxides can also be conveniently prepared from 3-mercapto-2-naphthoic acid by the process outlined in Chart 2.

We have also developed a novel process for the preparation of the compounds of the present invention. This process is outlined in Chart 3, wherein the preparation of the 2-arylnaphtho(2,3-b)thiophen-3(2H)-one-1,1-dioxides are exemplified. It is to be understood that this process can also be used for the preparation of the 2-arylbenzo(b)thiophen-3(2H)-one-1,1-dioxides as well.

CHART 3

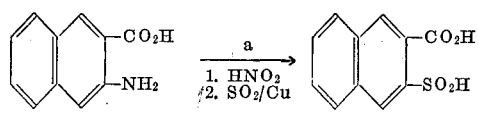

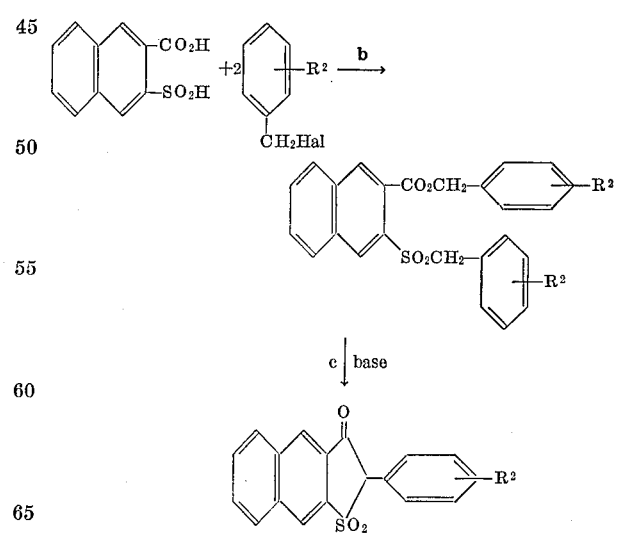

Hal = Cl, Br

In this process, the appropriate aminoaryl acid is diazotized in a tetrahydrofuran-water solution. Copper is suspended in the cold solution and sulfur dioxide is passed into the mixture with vigorous stirring. After standing for several hours, the organic layer is separated and concentrated to a small volume. Chloroform is added and the mixture is again concentrated. The residue is cooled and the sulfinoarylcarboxylic acid is filtered.

This compound is reacted in acetonitrile with a sufficient amount of the appropriate benzyl halide and a tertiary amine to yield the ester-sulfone (Chart 3, step b). The ester-sulfone is then converted into the corresponding 2-arylnaphtho(2,3-b)thiophen-3(2H)-one - 1,1 - dioxide by any of the cyclization methods previously discussed.

Most of the starting materials used to prepare the compounds of the present invention have been reported in the literature. The benzyl halides employed herein as precursors are conveniently prepared from the appropriately substituted toluenes by methods well known to those skilled in the art. Thus, the benzylchlorides can be readily synthesized by reaction of the toluenes with chlorine, preferably with exposure to ultraviolet light or alternatively, they may be prepared by reacting the toluenes with sulfuryl chloride in the presence of a peroxide.

The benzyl bromides can similarly be prepared from the toluenes by contacting them with elemental bromine in the presence of light. They can also be prepared by bromination in carbon tetrachloride with N-bromosuccinimide and a small amount of peroxide. All of the toluene precursors have been reported in the literature except the requisite trifluoromethylthiotoluenes, which can be prepared by the procedure of W. A. Sheppard et al., reported in J. Org. Chem., 29, 895, 898, (1964). From these compounds one can readily prepare the corresponding trifluoromethylsulfinyltoluenes and trifluoromethylsulfonyltoluenes by processes well known for the preparation of sulfoxides and sulfones e.g., hydrogen peroxide in glacial acetic acid.

The necessary benzylmercaptans are conveniently prepared from the corresponding benzylhalides by first heating the latter compounds with thiourea in absolute ethanol and then adding aqueous sodium hydroxide with further heating. The major portion of the ethanol is evaporated under reduced pressure, and the remaining, predominately aqueous solution is acidified. The benzylmercaptans are extracted with ether and purified by conventional procedures.

2-amino-5-trifluoromethylbenzoic acid can be prepared by aminating the commercially available 2-chloro-5-trifluoromethylbenzonitrile with ammonia to give 2-amino-5-trifluoromethylbenzonitrile, which can then be hydrolyzed to the desired acid.

In view of the susceptibility of the trifluoromethylthio and trifluoromethylsulfinyl groups to oxidation with hydrogen peroxide, compounds of the present invention which contain these groups in the 2-phenyl moiety are not prepared by those processes which involve oxidation with this reagent. Consequently, the processes outlined in Charts 1 and 2 are inappropriate for the preparation of compounds containing the above groups. Accordingly, for the preparation of these compounds we use the procedure outlined in Chart 3 since at no step of the process is hydrogen peroxide used.

As previously mentioned, we have shown that the 2-arylbenzo(b)thiophen-3(2H)-one-1,1-dioxides, as a class, and the related novel 2-arylnaphtho(2,3-b)thiophen-3(2H)-one-1,1-dioxides possess anti-inflammatory properties.

Nevertheless, we have found that 2-arylbenzo(b) thiophen-3(2H)-one-1,1-dioxides that have no substituents in the benzo(b) ring suffer from the disadvantage of being anticoagulins as well. We have now found that this undesirable attribute can be eliminated by incorporating suitable substituents in the benzo(b) ring of these compounds.

In contrast to the behavior of the 2-arylbenzo(b)thiophen-3(2H)-one-1,1-dioxides, we have observed that none of the novel 2-arylnaphtho(2,3-b)thiophen-3(2H)-one-1,1-dioxides inhibit coagulation of blood.

The substituents that we have found to be effective for the purpose of eliminating anticoagulin behavior in the 2-arylbenzo(b)thiophen-3(2H)-one-1,1-dioxides include $-CH_3$, $-NO_2$, and $-CF_3$, although other groups such as $(CH_3)_2NSO_2-$, $CH_3CO-$, $CF_3SO-$, $CF_3SO_2-$, $CH_3S-$, $CH_3SO-$, and $CH_3SO_2$, may also be incorporated into the benzo(b) ring. Such compounds can conveniently be prepared by the processes outlined above, starting with precursors containing the requisite substituents. The necessary precursors can be readily prepared by methods well known to those skilled in the art.

Table I contains results illustrating the anti-inflammatory activity of a number of the compounds of the present invention, as determined by the inhibition of edema formation in the hind paw of rats (Charles River Strain; average weight 170 g.) in response to a sub-plantar injection of carrageenin ("rat-foot edema test"). The experimental procedures followed are those of Winter et al., as reported in Proc. Soc. Exp. Biol, New York, 111, 544 (1962) and J. Pharmacol, Exp. Therap., 141, 369 (1963).

TABLE I

| R | R¹ | Rat Foot Edema Test — Inhibition of edema formation after dosage with 100 mg. of compound/kg. of body weight as compared with untreated subjects, percent. |
|---|---|---|
| $CF_3$ | $C_6H_5-$ | 49 |
| $CF_3$ | $3'-CF_3C_6H_4-$ | 45 |
| $CH_3$ | $C_6H_5-$ | 21 |
| $CH_3$ | $3'-CF_3C_6H_4-$ | 19 |
| $CH_3$ | $3'-NO_2C_6H_4-$ | 18 |
| $CH_3$ | $4'-ClC_6H_4$ | 31 |
| $NO_2$ | $3'-CH_3C_6H_4$ | 30 |
| 2-(3'-trifluoromethylphenyl)naphtho (2,3-b)thiophen-3(2H)-one-1,1-dioxide | | 44 |
| 2-(4'-chlorophenyl)naphtho(2,3-b) thiophen-3(2H)-one-1,1-dioxide | | 21 |

In this test, unanesthetized adult male albino rats of 150 g. to 190 g. body weight are numbered, weighed, and an ink mark placed on the right lateral malleolus. Each paw is immersed in mercury exactly to the ink mark. The mercury is contained in a glass cylinder, connected to a Statham Pressure Transducer. The output from the transducer is fed through a control unit to a microvoltameter. The volume of mercury displaced by the immersed paw is read. Drugs are given by gavage. One hour after drug administration, edema is induced by injection of 0.05 ml. of 1% solution of carrageenin into the plantar tissue of the marked paws. Immediately thereafter, the volume of the injected foot is measured. The increase in foot volume 3 hours after the injection of carrageenin constituents the individual response. The increase in volume of the feet of drug-treated animals are compared with those just receiving vehicle alone. The results obtained for some of the compounds of the present invention are tabulated in Table I.

The effect of the 2-arylnaphtho(2,3-b)thiophen-3(2H)-one-1,1-dioxides on the inhibition of prothrombin synthesis is shown in Table II.

TABLE II

| R | R¹ | Prothrombin Time in Rats (seconds) | |
|---|---|---|---|
| | | 2 oral doses (100 mg./kg.), 8 hours apart | 9 oral doses (100 mg./kg.), 8 hours apart |
| H | $C_6H_5-$ | 28.5±0.5 | |
| H | $4'-ClC_6H_4-$ | 90.1±7.5 | |
| $CF_3$ | $C_6H_5-$ | 15.0 | 15.9±0.6 |
| $CH_3$ | $4'ClC_6H_4-$ | 15.6±0.0 | 14.5±1.0 |
| 2-(3'-trifluoromethylphenyl)naphtho (2,3b)-thiophen-3(2H)-one-1,1-dioxide | | 15.5±0.5 | 15.3±0.8 |
| Controls ¹ | | 15.5±2.0 | 15.0±2.0 |

¹ Without drug.

Inhibition of prothrombin synthesis was measured in rats after oral administration of 2 doses (100 mg./kg.) of drugs, in aqueous solution, 8 hours apart and after 9 doses (100 mg./kg.) 8 hours apart. Sixteen hours after the last dose, blood samples were drawn into oxalated syringes, from the descending aorta while the animals were maintained under light pentobarbital anesthesia. Plasma was separated by centrifugation, and prothrombin time was determined automatically with a Model 202 Clot Timer (Mechrolab Inc.) using thromboplastin extract (Simplastin, Warner-Chilcott, Morris Plains, N.J.) as directed by the manufacturer.

Anti-inflammatory activity was retained in adrenalectomized rats given the compounds in Table I and then subjected to the rat foot edema test. Bilateral adrenalectomy was performed through a retroperitoneal incision, while the rats were maintained under light methoxyflurane (Metofane, Pitman-Moore, Indianapolis, Ind.) anesthesia. Animals were maintained on a normal diet with 0.9% saline in place of drinking water, and were used 5-7 days post-operatively.

Examination of Table II clearly reveals that the absence of substitutents in the benzo(b) ring of the 2-arylbenzo(b)-thiophen-3(2H)-one-1,1-dioxides results in an undesirable increase in prothrombin time, i.e., such compounds prevent blood coagulation. The few known compounds in the 2 - arylbenzo(b)thiophen-3(2H)-one-1,1-dioxides series are unsubstituted in the benzo(b) ring and consequently are undesirable pharmacologically because they exhibit the above side-effect.

As can be seen by examination of Table II, the novel compounds of the present invention, which all contain substituents in the benzo(b)-ring, are effective as anti-inflammatory agents (see Table I), but have the pharmalogical advantage of not inhibiting prothrombin synthesis. The compounds of the present invention are useful in alleviating the swelling and inflammation exhibited by arthritic and rheumatic subjects. These compounds can be administered either alone or in combinations with pharmaceutically-acceptable carriers. The proportion of active ingredient to carrier is determined by the solubility and chemical nature of the compound, chosen route of administration and standard pharmaceutical practice. For oral administration in capsule form, preferred excipients are lactose and high molecular weight polyethylene glycols. When aqueous suspensions are desired, the essential active ingredients are combined with emulsifying and/or suspending agents. Diluents such as ethanol, propylene glycol, glycerine and various combinations of diluents are employed. For parenteral administration, solutions of the active ingredients in combination with other solutes such as glucose or saline are used. Such aqueous solutions should be suitably buffered, if necessary, to render them isotonic.

The dosage required to reduce inflammation and swelling in arthritic and rheumatic subjects will be determined by the nature and the extent of the symptoms. Generally, small dosages will be administered initially with a gradual increase in dosage until the optimum level is determined. It will generally be found that when the composition is administered orally, larger quantities of the active ingredient will be required to produce the same level as produced by a smaller quantity administered parenterally. In general, from about 0.02 to 200 mg. of active ingredient per kilogram of body weight administered in single or multiple dosage units effectively reduces inflammation and swelling in arthritic and rheumatic subjects.

The following examples are provided to more fully illustrate the present invention, but are not to be construed as limiting the scope thereof in any way.

EXAMPLE I

To 95 ml. of boiling water is added 86 g. (0.355 mole) of $Na_2S \cdot 9H_2O$ and 11.2 g. of powdered sulfur. After solution is complete, 13 g. of sodium hydroxide (0.33 mole) in 33 ml. of water is added and the resultant solution is cooled to 0° C. and set aside.

To a mixture of 165 ml. of water and 66 ml. of concentrated hydrochloric acid is added 50 g. (0.331 mole) of 5-methylanthranilic acid. The mixture is cooled to about 0° C. and a solution of 23 g. (0.331 mole) of sodium nitrite in 93 ml. of water is added with vigorous stirring beneath the surface of the mixture over a period of about 10 minutes. Care is taken to keep the temperature of the mixture below 5° C. and to this end about 200 g. of cracked ice is added during the addition of the sodium nitrite solution.

This latter solution is then added to the first solution prepared above at 0° C. over a period of from 20 to 30 minutes. During the addition, sufficient ice is added to maintain the temperature of the mixture at about 0° C.

The resultant solution is then allowed to warm to room temperature and stirred for 2 hours. It is then acidified to the Congo Red endpoint with about 50 ml. of concentrated hydrochloric acid. The crude 2,2'-dicarboxy-di-4-tolyl disulfide which separates is collected and washed with water. The sulfur impurities it contains are removed by dissolving it in a solution of 20 g. of sodium carbonate in 660 ml. of water, heating the mixture, and filtering the sulfur residue. The filtrate is acidified with concentrated hydrochloric acid and the precipitated product separated and dried to afford 66 g. of 2,2'-dicarboxy-di-4-tolyl disulfide.

The entire amount of this latter compound is added to a mixture of 45 g. of zinc dust in 500 ml. of glacial acetic acid. The resultant mixture is refluxed for about 4 hours, cooled, and the crude 5-methylthiosalicyclic acid filtered. The crude product is dissolved in hot, aqueous sodium hydroxide solution and the resultant solution is filtered. The filtrate is cooled, acidified with concentrated hydrochloric acid, and the 5-methylthiosalicyclic acid that separates is collected, washed with water, and dried in a vacuum oven at 45° C. The yield is 23 g., M.P. 163–164° C.

EXAMPLE II

To a solution of 4.15 g. (0.030 mole) of potassium carbonate in 50 ml. of water is successively added 100 ml. of ethanol, 5.05 g. (0.030 mole) of 5-methylthiosalicyclic acid and 3.8 g. (0.030 mole) of benzyl chloride. After the evolution of carbon dioxide ceases (about 10 minutes), the mixture is refluxed on a steam bath for one hour. The mixture is cooled, and the major portion of the solvent is evaporated under reduced pressure. The cloudy white liquid residue is diluted to a volume of about 600 ml. with water. The mixture is filtered, cooled, and acidified with 6 N hydrochloric acid. The white precipitate which forms is separated, filtered, and triturated with about 400 ml. of water. Filtration and drying under high vacuum provides 6.9 g. (89% yield) of 2-benzylthio-5-methylbenzoic acid, M.P. 169–171° C. sint. 167° C.

EXAMPLE III

To 200 ml. of 97% formic acid is added 6.1 g. (0.024 mole) of 2-benzylthio-5-methylbenzoic acid. The mixture is heated on a water bath at about 54° C. while 15 ml. of 30% hydrogen peroxide is added over a period of about 25 minutes. After the addition of the hydrogen peroxide is complete, the mixture is heated at 54° for about 3 hours. The reaction mixture is cooled to room temperature and allowed to stand overnight.

The formic acid is distilled at reduced pressure and the pale yellow solid residue is dried over phosphorus pentoxide for about 2 hours. It is triturated with about 300 ml. of water, filtered, and dried in a vacuum desiccator over phosphorus pentoxide to yield 6.5 g. (91% yield) of 2-benzylsulfonyl-5-methylbenzoic acid, M.P. 198–201° C.

EXAMPLE IV

Into 300 ml. of ethanol, which has been saturated with hydrogen chloride, is added 5.7 g. (0.0195 mole) of 2- benzylsulfonyl-5-methylbenzoic acid. After refluxing the mixture for 15 hours, it is allowed to stand at room temperature for 48 hours. The solvent is evaporated under reduced pressure and the residue is partitioned between a mixture of 400 ml. of 10% sodium bicarbonate and ether. The ether phase is separated and set aside. The aqueous phase is extracted with 200 ml. of ether. The ether extracts are combined, washed with water, and dried over anhydrous sodium sulfate. Evaporation of the ether provides 5.8 g. of crude, oily methyl 2-benzylsulfonyl-5-methylbenzoate.

The product is dissolved in 200 ml. of ethanol, and 80 ml. of a 1 molar ethanolic sodium ethoxide solution is added. The mixture is refluxed 1½ hours, cooled and the solvent removed under reduced pressure. The residue is added to about 250 ml. of water and the mixture acidified with 6 N hydrochloric acid. The white precipitate that separates is filtered, washed with 250 ml. of water, filtered and dried under reduced pressure. The yield of 5-methyl-2-phenylbenzo(b)thiophen-3(2H)-one-1,1-dioxide is 3.75 g. (71%), M.P. 181–185° C., sint. 181° C. Neutralization equivalent.—Theoretical: 272. Found: 274.

EXAMPLE V

Following essentially the same procedure as in Example II, the results in Table III are obtained when the benzyl halides are reacted with 5-methylthiosalicyclic acid.

TABLE III

| Benzyl halide | Product | Yield, percent | M.P., °C. |
|---|---|---|---|
| m-Nitrobenzylchloride | 5-methyl-2-(m-nitrobenzylthio) benzoic acid | 95 | 164–167, sint. 162 |
| m-Trifluoromethyl-benzyl chloride | 5-methyl-2-(m-trifluoromethylbenzylthio)benzoic acid | 96 | 153–155 |
| p-Chlorobenzyl chloride | 5-methyl-2-(p-chlorobenzylthio)benzoic acid | 91 | 188–191 |

In an analogous manner, the benzyl halides in Table IV, Column A (R=—CH$_3$) can be reacted with 5-methylthiosalicylic to afford the benzylthiobenzoic acids listed in Table IV, Column C (R=—CH$_3$).

TABLE IV

| A | B | C | D | E |
|---|---|---|---|---|
|   |   | R—C$_6$H$_3$(CO$_2$H)(SCH$_2$R$^1$) | R—C$_6$H$_3$(CO$_2$H)(SO$_2$CH$_2$R$^1$) | R—C$_6$H$_3$ fused benzothiophenone-SO$_2$-R$^1$ |
|   |   | R$^1$ | R$^1$ | R$^1$ |
| 2-methylbenzyl chloride | 2-methylbenzylmercaptan | 2-CH$_3$C$_6$H$_4$— | 2-CH$_3$C$_6$H$_4$— | 2-CH$_3$C$_6$H$_4$— |
| 4-methylbenzyl chloride | 4-methylbenzylmercaptan | 4-CH$_3$C$_6$H$_4$— | 4-CH$_3$C$_6$H$_4$— | 4-CH$_3$C$_6$H$_4$— |
| 2-methoxybenzyl chloride | 2-methoxybenzylmercaptan | 2-CH$_3$OC$_6$H$_4$— | 2-CH$_3$OC$_6$H$_4$— | 2-CH$_3$OC$_6$H$_4$— |
| 3-methoxybenzyl chloride | 3-methoxybenzylmercaptan | 3-CH$_3$OC$_6$H$_4$— | 3-CH$_3$OC$_6$H$_4$— | 3-CH$_3$OC$_6$H$_4$— |
| 4-methoxybenzyl chloride | do | 4-CH$_3$OC$_6$H$_4$— | 4-CH$_3$OC$_6$H$_4$— | 4-CH$_3$OC$_6$H$_4$— |
| 2-nitrobenzyl chloride | 2-nitrobenzylmercaptan | 2-NO$_2$C$_6$H$_4$— | 2-NO$_2$C$_6$H$_4$— | 2-NO$_2$C$_6$H$_4$— |
| 4-nitrobenzyl chloride | 4-nitrobenzylmercaptan | 4-NO$_2$C$_6$H$_4$— | 4-NO$_2$C$_6$H$_4$— | 4-NO$_2$C$_6$H$_4$— |
| 2-chlorobenzyl chloride | 2-chlorobenzylmercaptan | 2-ClC$_6$H$_4$— | 2-ClC$_6$H$_4$— | 2-ClC$_6$H$_4$— |
| 3-chlorobenzyl chloride | 3-chlorobenzylmercaptan | 3-ClC$_6$H$_4$— | 3-ClC$_6$H$_4$— | 3-ClC$_6$H$_4$— |
| 2-bromobenzyl chloride | 2-bromobenzylmercaptan | 2-BrC$_6$H$_4$— | 2-BrC$_6$H$_4$— | 2-BrC$_6$H$_5$— |
| 3-bromobenzyl chloride | 3-bromobenzylmercaptan | 3-BrC$_6$H$_4$— | 3-BrC$_6$H$_4$— | 3-BrC$_6$H$_4$— |
| 4-bromobenzyl chloride | 4-bromobenzylmercaptan | 4-BrC$_6$H$_4$— | 4-BrC$_6$H$_4$— | 4-BrC$_6$H$_4$— |
| 2-fluorobenzyl chloride | 2-fluorobenzylmercaptan | 2-FC$_6$H$_4$— | 2-FC$_6$H$_4$— | 2-FC$_6$H$_4$— |
| 3-fluorobenzyl chloride | 3-fluorobenzylmercaptan | 3-FC$_6$H$_4$— | 3-FC$_6$H$_4$— | 3-FC$_6$H$_4$— |
| 4-fluorobenzyl chloride | 4-fluorobenzylmercaptan | 4-FC$_6$H$_4$— | 4-FC$_6$H$_4$— | 4-FC$_6$H$_4$— |
| 2-trifluoromethylbenzyl chloride | 2-trifluoromethylbenzylmercaptan | 2-CF$_3$C$_6$H$_4$— | 2-CF$_3$C$_6$H$_4$— | 2-CF$_3$C$_6$H$_4$— |
| 4-trifluoromethylbenzyl chloride | 4-trifluoromethylbenzylmercaptan | 4-CF$_3$C$_6$H$_4$— | 4-CF$_3$C$_6$H$_4$— | 4-CF$_3$C$_6$H$_4$— |
| 2-trifluoromethylsulfonylbenzyl chloride | 2-trifluoromethylbenzylsulfonylmercaptan | 2-CF$_3$SO$_2$—C$_6$H$_4$— | 2-CF$_3$SO$_2$-C$_6$H$_4$— | 2-CF$_3$SO$_2$—C$_6$H$_4$— |
| 3-trifluoromethylsulfonylbenzyl chloride | 3-trifluoromethylbenzylsulfonylmercaptan | 3-CF$_3$SO$_2$—C$_6$H$_4$— | 3-CF$_3$SO$_2$—C$_6$H$_4$— | 3-CF$_3$SO$_2$—C$_6$H$_4$— |
| 4-trifluoromethylsulfonylbenzyl chloride | 4-trifluoromethylbenzylsulfonylmercaptan | 4-CF$_3$SO$_2$—C$_6$H$_4$— | 4-CF$_3$SO$_2$—C$_6$H$_4$— | 4-CF$_3$SO$_2$—C$_6$H$_4$— |
| α-Chlormethylnaphthalene | α-Mercaptomethylnaphthalene | α-Naphthyl | α-Naphthyl | α-Naphthyl |
| β-Chloromethylnaphthalene | β-Mercaptomethylnaphthalene | β-Naphthyl | β-Naphthyl | β-Naphthyl |

R=—CH$_3$, —CF$_3$, —NO$_2$.

EXAMPLE VI

Following essentially the same procedure of Example III, the results listed in Table V are obtained when the products listed in Table III are reacted with hydrogen peroxide in formic acid.

TABLE V

| Benzoic acid | Product | Yield, percent | M.P., °C. |
|---|---|---|---|
| 5-methyl-2-(m-nitrobenzylthio)benzoic acid | 5-methyl-2-(m-nitrobenzylsulfonyl)benzoic acid | 83 | 13–216. |
| 5-methyl-2-(m-trifluoromethylbenzylthio)benzoic acid | 5-methyl-2-(m-trifluoromethylbenzylsulfonyl)benzoic acid | 96 | 156–159 sint. 151. |
| 5-methyl-2(p-chlorobenzylthio)benzoic acid | 5-methyl-2(p-chlorobenzylsulfonyl)benzoic acid | 95 | 184–186 sint. 182. |

In an analogous manner the substituted 2-(benzylthio) benzoic acid listed in Table IV, Column C (R=—CH$_3$) can be converted to the corresponding benzylsulfonylbenzoic acids given in Table IV, Column D (R=—CH$_3$).

EXAMPLE VII

Following essentially the procedure of Example IV, 5-methyl 2-(m-nitrobenzylsulfonyl)benzoic acid is reacted as described, and a 38% yield of 5-methyl-2-(m-nitrophenyl)benzo(b)-thiophen-3(2H)-one-1,1 - dioxide, M.P. 212–214° C. with sintering at 180°, is obtained. Infrared spectrum (μ): 5.8, 6.55, 7.40, 7.65, 8.05.

In a similar fashion, 5-methyl-2-(m-trifluoromethylbenzylsulfonyl)benzoic acid and 5-methyl-2-(p-chlorobenzylsulfonyl)benzo acid are converted to 5-methyl-2-(m - trifluoromethylphenyl)benzo(b) - thiophen - 3(2H)-one-1,1-dioxide and 5-methyl-2-(p-chlorophenyl)-benzo-(b)-thiophen-3(2H)-one-1,1-dioxide, respectively.

Likewise, the sulfonylbenzoic acids in Table IV, Column D (R=—CH₃), can be converted to the 2-phenyl-benzo(b)thiophen-3(2H)-one-1,1-dioxides in Column E (R=—CH₃) by the process of Example IV.

EXAMPLE VIII

To 50 ml. of anhydrous benzene is added 8.0 g. (0.0223 moles) of 5-mehtyl 2-(m-trifluoromethylbenzylsulfonyl) benzoic acid and 50 ml. of thionyl chloride. The resulting white suspension is refluxed under anhydrous conditions and a nitrogen atmosphere on a steam bath for 1 hour. The solvent is evaporated under reduced pressure and the crude, solid 5-methyl 2-(m-trifluoromethylbenzylsulfonyl)benzoyl chloride is added to 50 ml. of methanol, under a nitrogen atmosphere and anhydrous conditions, and refluxed for 1 hour on a steam bath. The solvent is removed under reduced pressure and the crude semi-solid, methyl 5-methyl - 2 - (m-trifluoromethylbenzylsulfonyl) benzoate is suspended in 90 ml. of absolute ethanol. To this suspension is added 90 ml. of a 1 molar ethanolic sodium ethoxide solution. The mixture is refluxed in a nitrogen atmosphere and under anhydrous conditions for 1½ hours. The solvent is evaporated under reduced pressure, and the residue is dissolved in about 500 ml. of water. The resultant solution is cooled and acidified with 6 N hydrochloric acid. The white solid which precipitates upon acidification is filtered, washed with about 400 ml. of water, and thoroughly dried to give 7.2 g. (95% yield) of 5-methyl 2 - (m - trifluoromethylphenyl)benzo(b)thiophen-3(2H)-one-1,1-dioxide, M.P. 142–145° C. with sintering at 140° C. Infrared spectrum (μ): 5.80, 7.49, 7.54, 8.05.

EXAMPLE IX 5-methyl 2-(p-chlorophenyl)benzo(b)thiophen-3(2H)-one-1,1-dioxide is prepared in 95% yield from 5-methyl 2-(p-chlorobenzylsulfonyl)benzoic acid following the procedure of Example VIII, M.P. 133–135° C. Infrared spectrum (μ): 5.79, 7.55, 8.53.

Similarly, 5-methyl-2-(benzylsulfonyl)benzoic acid and 5-methyl-2-(m-nitrobenzylsulfonyl)benzoic acid are converted to the corresponding thiophen-1,1-dioxides.

Likewise, the substituted sulfonylbenzoic acids listed in Table IV, Column D (R=—CH₃) can also be converted to the corresponding 2,5-di-substituted benzo(b)-thiophen-1,1-dioxides in Column E (R=—CH₃) by the procedure of Example VIII with essentially similar results.

To a mixture of 265 ml. of water and 107 ml. of concentrated hydrochloric acid is added 100 g. (0.54 mole) of 2-amino-3-naphthoic acid. The mixture is cooled to about 0° C. and a solution of 36.6 g. of sodium nitrite in 100 ml. of water is added with vigorous stirring beneath the surface of the mixture over a period of about 10 minutes. Care is taken to keep the temperature of the mixture below 5° C. and to this end cracked ice is added during the addition of the sodium nitrite solution.

This latter solution is then added to the first solution prepared above at 0° C. over a period of 20 to 30 minutes. During the addition, sufficient ice is added to maintain the temperature of the mixture at about 0° C.

The resultant solution is allowed to warm to room temperature and stirred for 2 hours. It is then acidified to the Congo Red endpoint with concentrated hydrochloric acid. The crude 3,3-dicarboxy-di-2-naphthyl disulfide which separates is collected and washed with water. The sulfur impurities are removed by dissolving it in a solution of 22 g. of sodium carbonate in 1100 ml. of water, heating the mixture, and filtering the sulfur residue. The filtrate is acidified with concentrated hydrochloric acid and the precipitated 3,3-dicarboxy-di-2-naphthyl disulfide separated.

The entire amount of this latter compound is added to a mixture of 72 g. of zinc dust in 820 ml. of glacial acetic acid. The resultant mixture is refluxed for about 4 hours, cooled, and the crude 3-mercapto-2-naphthoic acid filtered. The crude product is dissolved in hot, aqueous sodium hydroxide solution and the resultant solution is filtered. The filtrate is cooled, acidified with concentrated hydrochloric acid, and the 3-mercapto-2-naphthoic acid that separates is collected, washed with water and dried in a vacuum oven at 45° C. The yield is 43 g., M.P. 219–221° C.

EXAMPLE XI 3-mercapto-2-naphthoic acid is reacted with m-trifluoromethylbenzylchloride according to the procedure of Example II, with the exception that after evaporation of the ethanol, the residue is dissolved in a 1:2 (v./v.) methanol-water mixture, rather than water, prior to acidification with 6 N hydrochloric acid. A 70% yield of 3-m-trifluoromethylbenzylthio-2-naphthoic acid is obtained, M.P. 222–225° C. with sintering at 190–197° C. Infrared spectrum (μ): 3.4(8), 5.99, 7.5.

EXAMPLE XII

Following essentially the same procedure as described in Example II, the benzylthionaphthoic acids in Table VI are obtained when the benzyl halides listed therein are reacted with 3-mercapto-2-naphthoic acid.

TABLE VI

| Benzyl chloride | Product | Yield, percent | M.P.,° C. |
|---|---|---|---|
| Benzyl chloride | 3-benzylthio-2-naphthoic acid | 94 | 224–232 sint. 183 |
| p-Chlorobenzyl chloride | 3-p-chlorobenzylthio-2-naphthoic aicd | 48 | 218–221 |

EXAMPLE X

To 155 ml. of boiling water is added 149 g. of Na₂S·9H₂O and 18 g. of powdered sulfur. After solution is complete, 21.4 g. of sodium hydroxide in 53 ml. of water is added and the resultant solution is cooled to 0° C. and set aside.

Likewise, the benzyl halides in Table VII, Column A can also be reacted with 3-mercapto-2-naphthoic acid to give the corresponding naphthoic acids in Column B of Table VII.

TABLE VII

| A | B | C | D |
|---|---|---|---|
| | naphthalene-CO$_2$H with -SCH$_2$-R$^1$ | naphthalene-CO$_2$H with -SO$_2$CH$_2$R$^1$ | naphthalene ketone with R$^1$ and SO$_2$ (cyclic) |
| | R$^1$= | R$^1$= | R$^1$= |
| 2-methylbenzyl chloride | 2-CH$_3$C$_6$H$_4$— | 2-CH$_3$C$_6$H$_4$— | 2-CH$_3$C$_6$H$_4$— |
| 3-methylbenzyl chloride | 3-CH$_3$C$_6$H$_4$— | 3-CH$_3$C$_6$H$_4$— | 3-CH$_3$C$_6$H$_4$— |
| 4-methylbenzyl chloride | 4-CH$_3$C$_6$H$_4$— | 4-CH$_3$C$_6$H$_4$— | 4-CH$_3$C$_6$H$_4$— |
| 2-methoxybenzyl chloride | 2-CH$_3$OC$_6$H$_4$— | 2-CH$_3$OC$_6$H$_4$— | 2-CH$_3$OC$_6$H$_4$— |
| 3-methoxybenzyl chloride | 3-CH$_3$OC$_6$H$_4$— | 3-CH$_3$OC$_6$H$_4$— | 3-CH$_3$OC$_6$H$_4$— |
| 4-methoxybenzyl chloride | 4-CH$_3$OC$_6$H$_4$— | 4-CH$_3$OC$_6$H$_4$— | 4-CH$_3$OC$_6$H$_4$— |
| 2-nitrobenzyl chloride | 2-NO$_2$C$_6$H$_4$— | 2-NO$_2$C$_6$H$_4$— | 2-NO$_2$C$_6$H$_4$— |
| 3-nitrobenzyl chloride | 3-NO$_2$C$_6$H$_4$— | 3-NO$_2$C$_6$H$_4$— | 3-NO$_2$C$_6$H$_4$— |
| 4-nitrobenzyl chloride | 4-NO$_2$C$_6$H$_4$— | 4-NO$_2$C$_6$H$_4$— | 4-NO$_2$C$_6$H$_4$— |
| 2-chlorobenzyl chloride | 2-ClC$_6$H$_4$— | 2-ClC$_6$H$_4$— | 2-ClC$_6$H$_4$— |
| 3-chlorobenzyl chloride | 3-ClC$_6$H$_4$— | 3-ClC$_6$H$_4$— | 3-ClC$_6$H$_4$— |
| 2-bromobenzyl chloride | 2-BrC$_6$H$_4$— | 2-BrC$_6$H$_4$— | 2-BrC$_6$H$_4$— |
| 3-bromobenzyl chloride | 3-BrC$_6$H$_4$— | 3-BrC$_6$H$_4$— | 3-BrC$_6$H$_4$— |
| 4-bromobenzyl chloride | 4-BrC$_6$H$_4$— | 4-BrC$_6$H$_4$— | 4-BrC$_6$H$_4$— |
| 2-fluorobenzyl chloride | 2-FC$_6$H$_4$— | 2-FC$_6$H$_4$— | 2-FC$_6$H$_4$— |
| 3-fluorobenzyl chloride | 3-FC$_6$H$_4$— | 3-FC$_6$H$_4$— | 3-FC$_6$H$_4$— |
| 4-fluorobenzyl chloride | 4-FC$_6$H$_4$— | 4-FC$_6$H$_4$— | 4-FC$_6$H$_4$— |
| 2-trifluoromethylbenzyl chloride | 2-CF$_3$C$_6$H$_4$— | 2-CF$_3$C$_6$H$_4$— | 2-CF$_3$C$_6$H$_4$— |
| 4-trifluoromethylbenzyl chloride | 4-CF$_3$C$_6$H$_4$— | 4-CF$_3$C$_6$H$_4$— | 4-CF$_3$C$_6$H$_4$— |
| 2-trifluoromethylsulfonylbenzyl chloride | 2-CF$_3$SO$_2$C$_6$H$_4$— | 2-CF$_3$SO$_2$C$_6$H$_4$— | 2-CF$_3$SO$_2$C$_6$H$_4$— |
| 3-trifluoromethylsulfonylbenzyl chloride | 3-CF$_3$SO$_2$C$_6$H$_4$— | 3-CF$_3$SO$_2$C$_6$H$_4$— | 3-CF$_3$SO$_2$C$_6$H$_4$— |
| 4-trifluoromethylsulfonylbenzyl chloride | 4-CF$_3$SO$_2$C$_6$H$_4$— | 4-CF$_3$SO$_2$C$_6$H$_4$— | 4-CF$_3$SO$_2$C$_6$H$_4$— |
| α-Chloromethylnaphthalene | α-Naphthyl | α-Naphthyl | α-Naphthyl |
| β-Chloromethylnaphthalene | β-Naphthyl | β-Naphthyl | β-Naphthyl |

EXAMPLE XIII

The 3-substituted benzylthio 2-naphthoic acids prepared in Examples XI and listed in Table VI are oxidized according to the procedure of Example III to yield the corresponding 3 - substituted benzylsulfonyl-2-naphthoic acids listed in Table VIII.

C are conveniently converted to the corresponding 3-benzylsulfonyl-2-naphthoic acids in Column D.

EXAMPLE XV

To a mixture of 2.5 l. of water and 4.2 l. of tetrahydrofuran, is added 314 g. (1.68 moles) of 3-amino-2-

TABLE VIII

| Benzylthionaphthoic acid | Product | Yield, percent | M.P., °C. |
|---|---|---|---|
| 3-benzylthio-2-naphthoic acid | 3-benzylsulfonyl-2-naphthoic acid | 79 | 143–151 sint. 88 |
| 3-p-chlorobenzylthio-2-naphthoic acid | 3-p-chlorobenzylsulfonyl-2-naphthoic acid | 58 | [1] 207–209 |
| 3-m-trifluoromethyl-benzylthio-2-naphthoic acid | 3-m-trifluoromethylbenzylsulfonyl-2-naphthoic acid | 82 | 181–193 |

[1] Recrystallized from benzene.

Likewise the 3-substituted benzylthio naphthoic acids listed in Table VII, Column B can be oxidized to the corresponding 3-substituted benzylsulfonyl 2-naphthoic acids listed in Column C.

EXAMPLE XIV

The 3-benzylsulfonyl-2-naphthoic acids listed in Table VIII are converted to the 2-substituted-naphtho(2,3-b) thiophen-3(2H)-one-1,1-dioxides listed in Table IX by the procedure of Example VIII, with the exception that sodium methoxide in methanol is used in lieu of sodium ethoxide in ethanol and in the preparation of 2-(m-trifluoromethylphenyl) - naphtho(2,3 - b)thiophen - 3(2H)-one-1,1-dioxides and 2 - phenylnaphtho(2,3-b)thiophen-3(2H)-one-1,1-dioxides the solvent of choice for the acidification with 6 N hydrochloric acid is 4:1 water-methanol (v./v.) rather than water. The three naphtho-(2,3-b)thiophen-3(2H)-one-1,1 - dioxides are conveniently recrystallized from ethanol.

naphthoic acid. The resulting solution is cooled to about 18° C. and 840 ml. of concentrated sulfuric acid is slowly added with stirring and cooling, care being taken to keep the temperature below 28° C. The mixture is cooled to about —2° C. and a solution of 137 g. of sodium nitrite in 2 l. of water is slowly added with stirring over a period of about ¾ of an hour; care is taken to keep the temperature of the mixture below 5° C.

The mixture is stirred for 15 minutes at —2° C. and then 1.5 lbs. of sulphur dioxide (10.6 moles) is added over a five minute period, the temperature of the mixture being held at 0° C. Then 420 g. of finely divided copper is added in 40 g. portions every 10 minutes, over a period of 1½ hours. Sulphur dioxide is passed into the mixture for about 1 hour until a total of about 3 lbs. is added. During the above additions the temperature of the mixture is kept below 3° C. After the addition of the sulphur dioxide is complete, the temperature is slowly raised to about 10° C. It is then allowed to stand at room tempera-

TABLE IX

| | | | | Elemental Analysis | | | |
|---|---|---|---|---|---|---|---|
| | | | | Theoretical | | Found | |
| Reactant | Produce | Yield | M.P., °C. | Percent C | Percent H | Percent C | Percent H |
| 3-benzylsulfonyl-2-naphthoic acid | 2-phenylnaphtho(2,3-b)-thiophen-3(2H)-one-1,1-dioxide. | 74 | 170–173 | | | | |
| 3-p-chlorobenzylsulfonyl-2-naphthoic acid | 2-(p-chlorophenylnaphtho-2,3-b)-thiophen-3(2H)-one-1,1-dioxide. | 78 | 235–237 sint. 232 | 63.06 | 3.24 | 63.17 | 3.45 |
| 3-m-trifluoromethylbenzylsulfonyl-2-naphthoic acid | 2-(m-trifluoromethylphenyl-naphtho(2,3-b)-thiophen-3(2H)-one-1,1-dioxide. | 94 | 188–190 sint. 187 | 60.63 | 2.9 | 60.71 | 3.03 |

Similarly, using the procedure of Example VIII, the 3-benzylthio-2-naphthoic acids listed in Table VII, Column ture for about 16 hours. The aqueous phase is separated from the organic layer and the latter is filtered and treated with decalorizing charcoal. It is concentrated to a volume of about 1½ l. About 5½ l. of chloroform is added, and the solution is concentrated under reduced pressure to about 2 l. The resultant crystalline slurry is cooled to about 18° C. and filtered. The filtered solid is washed well with chloroform and dried at about 50° C. to yield approximately 200 g. of 3-sulfino-2-naphthoic acid, M.P. 142–143° C.

EXAMPLE XVI 3-sulfino-2-naphthoic acid (118 g., 0.50 mole), triethylamine (102 g., 1 mole) and m-trifluoromethylbenzyl chloride (194.6 g., 1 mole) is dissolved in 1 liter of anhydrous acetonitrile, and the resulting solution is refluxed (84° C.) for 16 hours. The solution is cooled to 8° C. and the diethylamine hydrochloride is filtered and washed with acetonitrile. The filtrate is concentrated under reduced pressure to a thick oil, to which is added 600 ml. of 5% hydrochloric acid. The mixture is extracted with six 0.5-liter portions of ether which are combined and washed with two 0.6-liter portions of water, treated with decolorizing charcoal, and concentrated to a volume of about 500 ml. To this mixture is added one liter of n-hexane and the resultant slurry is cooled to about 5° C. The mixture is filtered, washed with n-hexane, and air-dried at room temperature to give 138 g. of m-trifluoromethylbenzyl 3 - m - trifluoromethylbenzylsulfonyl - 2-naphthoate, M.P. 111–113° C.

Analysis.—Calc'd for $C_{27}H_{18}O_4F_6S$ (percent): C, 58.7; H, 3.3. Found (percent): C, 58.41; H, 3.46.

EXAMPLE XVII

To a solution of 32.4 g. of sodium methoxide (0.60 mole) in 1.1 l. of methanol at 30° C., is rapidly added with vigorous stirring, 111 g. (0.20 mole) of m-trifluoromethylbenzyl 3-m-trifluoromethylbenzylsulfonyl-2-naphthoate. The mixture is heated at the reflux temperature for 45 minutes and cooled to room temperature.

After concentration under reduced pressure to afford a crystalline slurry, 1 liter of water is added and the mixture is cooled to about 0° C. To this cooled mixture is slowly added dropwise 60 ml. of concentrated hydrochloric acid. The crystalline slurry is stirred for about 30 minutes at 0° C. and then filtered through a cloth filter. The filtered material is washed with water and air-dried at room temperature for about 60 hours to afford 96 g. of crude 2-m-trifluoromethylnaphtho(2,3-b)-thiophen-3(2H)-one-1,1-dioxide, M.P. 145–170° C. Recrystallization from ethanol provides pure product, M.P. 189–190° C.

Neutralization equivalent in 2:1 dioxane-water.—Theoretical: 376. Found. 376.

Analysis.—Calc'd for $C_{19}H_{11}O_3F_3S$ (percent): C, 60.63; H, 2.94; S, 8.30. Found (percent): C, 60.71; H, 3.03; S, 8.58.

EXAMPLE XVIII

Following the procedure of Example XVI, the benzyl chlorides in Table X, Column A are reacted with 3-sulfino-2-naphthoic acid, to provide the compounds given in Column B.

TABLE X

| A | B | C |
|---|---|---|
|   | naphthalene-CO₂CH₂-R¹ / -SO₂CH₂-R¹ | naphthalene-C(=O)-R¹ / SO₂ |
|   | R¹= | R¹= |
| Benzyl chloride | $C_6H_5$— | $C_6H_5$— |
| 2-methylbenzyl chloride | 2-$CH_3C_6H_4$— | 2-$CH_3C_6H_4$— |
| 3-methylbenzyl chloride | 3-$CH_3C_6H_4$— | 3-$CH_3C_6H_4$— |
| 4-methylbenzyl chloride | 4-$CH_3C_6H_4$— | 4-$CH_3C_6H_4$— |
| 2-methoxybenzyl chloride | 2-$CH_3OC_6H_4$ | 2-$CH_3OC_6H_4$— |
| 3-methoxybenzyl chloride | 3-$CH_3OC_6H_4$— | 3-$CH_3OC_6H_4$— |
| 4-methoxybenzyl chloride | 4-$CH_3OC_6H_4$— | 4-$CH_3OC_6H_4$— |
| 2-nitrobenzyl chloride | 2-$NO_2C_6H_4$— | 2-$NO_2C_6H_4$ |
| 3-nitrobenzyl chloride | 3-$NO_2C_6H_4$— | 3-$NO_2C_6H_4$— |
| 4-nitrobenzyl chloride | 4-$NO_2C_6H_4$— | 4-$NO_2C_6H_4$— |
| 2-chlorobenzyl chloride | 2-$ClC_6H_4$ | 2-$ClC_6H_4$— |
| 3-chlorobenzyl chloride | 3-$ClC_6H_4$— | 3-$ClC_6H_4$— |
| 4-chlorobenzyl chloride | 4-$ClC_6H_4$ | 4-$ClC_6H_4$— |
| 2-bromobenzyl chloride | 2-$BrC_6H_4$— | 2-$BrC_6H_4$— |
| 3-bromobenzyl chloride | 3-$BrC_6H_4$— | 3-$BrC_6H_4$— |
| 4-bromobenzyl chloride | 4-$BrC_6H_4$— | 4-$BrC_6H_4$ |
| 2-fluorobenzyl chloride | 2-$FC_6H_4$— | 2-$FC_6H_4$— |
| 3-fluorobenzyl chloride | 3-$FC_6H_4$— | 3-$FC_6H_4$— |
| 4-fluorobenzyl chloride | 4-$FC_6H_4$— | 4-$FC_6H_4$— |
| 2-trifluoromethylbenzyl chloride | 2-$CF_3C_6H_4$— | 2-$CF_3C_6H_4$— |
| 4-trifluoromethylbenzyl chloride | 4-$CF_3C_6H_4$— | 4-$CF_3C_6H_4$— |
| 2-trifluoromethylthiobenzyl chloride | 2-$CF_3SC_6H_4$— | 2-$CF_3SC_6H_4$— |
| 3-trifluoromethylthiobenzyl chloride | 3-$CF_3SC_6H_4$— | 2-$CF_3SC_6H_4$— |
| 4-trifluoromethylthiobenzyl chloride | 4-$CF_3SC_6H_4$— | 4-$CF_3SC_6H_4$— |
| 2-trifluoromethylsulfinylbenzyl chloride | 2-$CF_3SOC_6H_4$— | 2-$CF_3SOC_6H_4$— |
| 3-trifluoromethylsulfinylbenzyl chloride | 3-$CF_3SOC_6H_4$— | 3-$CF_3SOC_6H_4$— |
| 4-trifluoromethylsulfinylbenzyl chloride | 4-$CF_3SOC_6H_4$— | 4-$CF_3SOC_6H_4$— |
| 2-trifluoromethylsulfonylbenzyl chloride | 2-$CF_3SO_2C_6H_4$— | 2-$CF_3SO_2C_6H_4$— |
| 3-trifluoromethylsulfonylbenzyl chloride | 3-$CF_3SO_2C_6H_4$ | 4-$CF_3SO_2C_6H_4$— |
| 4-trifluoromethylsulfonylbenzyl chloride | 4-$CF_3SO_2C_6H_4$— | 3-$CF_3SO_2C_6H_4$— |
| α-Chloromethylnaphthalene | α-Naphthyl | α-Naphthyl |
| β-Chloromethylnaphthalene | β-Naphthyl | β-Naphthyl |

EXAMPLE XIX

Following the procedure of Example XVII, the compounds in Column C of Table X are prepared from the compounds of Column B.

EXAMPLE XX

Following the procedure of Example XV, the aminophenyl acids in Table XI, Column A are converted to the corresponding sulfinophenyl acids in Column B.

TABLE XI

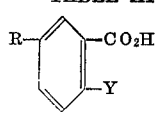

| A | | B | |
|---|---|---|---|
| R | Y | R | Y |
| $CF_3$ | $NH_2$ | $CF_3$ | $SO_2H$ |
| $CH_3$ | $NH_2$ | $CH_3$ | $SO_2H$ |
| $NO_2$ | $NH_2$ | $NO_2$ | $SO_2H$ |

EXAMPLE XXI

Following the procedure of Example XVI, the sulfinophenyl acids in Table XI, Column B can be reacted with the benzyl halides in Table XII, Column A, to provide compounds in Column B of Table XII.

added 21 g. (0.10 mole) of 4-chloro-3-cyano-benzotrifluoride. The reaction mixture is stirred under nitrogen at room temperature for ½ hour and then poured into about 800 ml. of ice-water. After stirring this mixture for 5 minutes, it is extracted with four 200 ml.-portions of ether.

TABLE XII

| A | B | C |
|---|---|---|
| | R—C$_6$H$_3$(CO$_2$CH$_2$R$^1$)(SO$_2$CH$_2$R$^1$) | R—benzo[b]thiophen-3(2H)-one-1,1-dioxide with R$^1$ substituent |
| | R$^1$ | R$^1$ |
| Benzyl chloride | C$_6$H$_5$— | C$_6$H$_5$— |
| 2-methylbenzyl chloride | 2-CH$_3$C$_6$H$_4$— | 2-CH$_3$C$_6$H$_4$— |
| 3-methylbenzyl chloride | 3-CH$_3$C$_6$H$_4$— | 3-CH$_3$C$_6$H$_4$— |
| 4-methylbenzyl chloride | 4-CH$_3$C$_6$H$_4$— | 4-CH$_3$C$_6$H$_4$— |
| 2-methoxybenzyl chloride | 2-CH$_3$OC$_6$H$_4$— | 2-CH$_3$OC$_6$H$_4$— |
| 3-methoxybenzyl chloride | 3-CH$_3$OC$_6$H$_4$— | 3-CH$_3$OC$_6$H$_4$— |
| 4-methoxybenzyl chloride | 4-CH$_3$OC$_6$H$_4$— | 4-CH$_3$OC$_6$H$_4$— |
| 2-nitrobenzyl chloride | 2-NO$_2$C$_6$H$_4$— | 2-NO$_2$C$_6$H$_4$— |
| 3-nitrobenzyl chloride | 3-NO$_2$C$_6$H$_4$— | 3-NO$_2$C$_6$H$_4$— |
| 4-nitrobenzyl chloride | 4-NO$_2$C$_6$H$_4$— | 4-NO$_2$C$_6$H$_4$— |
| 2-chlorobenzyl chloride | 2-ClC$_6$H$_4$— | 2-ClC$_6$H$_4$— |
| 3-chlorobenzyl chloride | 3-ClC$_6$H$_4$— | 3-ClC$_6$H$_4$— |
| 4-chlorobenzyl chloride | 4-ClC$_6$H$_4$— | 4-ClC$_6$H$_4$— |
| 2-bromobenzyl chloride | 2-BrC$_6$H$_4$— | 2-BrC$_6$H$_4$— |
| 3-bromobenzyl chloride | 3-BrC$_6$H$_4$— | 3-BrC$_6$H$_4$— |
| 4-bromobenzyl chloride | 4-BrC$_6$H$_4$— | 4-BrC$_6$H$_4$— |
| 2-fluorobenzyl chloride | 2-FC$_6$H$_4$— | 2-FC$_6$H$_4$— |
| 3-fluorobenzyl chloride | 3-FC$_6$H$_4$— | 3-FC$_6$H$_4$— |
| 4-fluorobenzyl chloride | 4-FC$_6$H$_4$— | 4-FC$_6$H$_4$— |
| 2-trifluoromethylbenzyl chloride | 2-CF$_3$C$_6$H$_4$— | 2-CF$_3$C$_6$H$_4$— |
| 3-trifluoromethylbenzyl chloride | 3-CF$_3$C$_6$H$_4$— | 3-CF$_3$C$_6$H$_4$— |
| 4-trifluoromethylbenzyl chloride | 4-CF$_3$C$_6$H$_4$— | 4-CF$_3$C$_6$H$_4$— |
| 2-trifluoromethylthiobenzyl chloride | 2-CF$_3$SC$_6$H$_4$— | 2-CF$_3$SC$_6$H$_4$— |
| 3-trifluoromethylthiobenzyl chloride | 3-CF$_3$SC$_6$H$_4$— | 3-CF$_3$SC$_6$H$_4$— |
| 4-trifluoromethylthiobenzyl chloride | 4-CF$_3$SC$_6$H$_4$— | 4-CF$_3$SC$_6$H$_4$— |
| 2-trifluoromethylsulfinylbenzyl chloride | 2-CF$_3$SOC$_6$H$_4$— | 2-CF$_3$SOC$_6$H$_4$— |
| 3-trifluoromethylsulfinylbenzyl chloride | 3-CF$_3$SOC$_6$H$_4$— | 3-CF$_3$SOC$_6$H$_4$— |
| 4-trifluoromethylsulfinylbenzyl chloride | 4-CF$_3$SOC$_6$H$_4$— | 4-CF$_3$SOC$_6$H$_4$— |
| 2-trifluoromethylsulfonylbenzyl chloride | 2-CF$_3$SO$_2$C$_6$H$_4$— | 2-CF$_3$SO$_2$C$_6$H$_4$— |
| 3-trifluoromethylsulfonylbenzyl chloride | 3-CF$_3$SO$_2$C$_6$H$_4$— | 3-CF$_3$SO$_2$C$_6$H$_4$— |
| 4-trifluoromethylsulfonylbenzyl chloride | 4-CF$_3$SO$_2$C$_6$H$_4$— | 4-CF$_3$SO$_2$C$_6$H$_4$— |
| α-Chloromethylnaphthalene | α-Naphthyl | α-Naphthyl |
| β-Chloromethylnaphthalene | β-Naphthyl | β-Naphthyl |

R = —CH$_3$; —CF$_3$; —NO$_2$.

EXAMPLE XXII

Following the procedure of Example XVI, the compounds in Column B of Table XII can be converted, with substantially the same results, into the corresponding 2-substituted phenylbenzo(b)-thiophen-3(2H)-one-1,1-dioxides, listed in Column C.

EXAMPLE XXIII

General procedure for the preparation of benzylmercaptans from the corresponding benzyl halides 0.50 mole of the appropriate benzyl halide is refluxed for about 3 hours with 0.50 mole of thiourea in about 250–400 ml. of absolute ethanol. About 300 ml. of a 10% sodium hydroxide solution is added to the resultant solution, and the resulting mixture is refluxed for another 2 hours.

The major portion of the ethanol is removed under reduced pressure. The aqueous mixture is cooled, acidified with sulfuric acid, and extracted with ether. The ether extracts are dried over anhydrous sodium sulfate, and evaporated. The residual crude benzylmercaptan is then purified by conventional procedures. In this manner, the benzyl chlorides described in Column A of Table IV may be converted to the corresponding benzylmercaptans in Column B.

EXAMPLE XXIV

Into 100 ml. of ethanol is added 12.4 g. (0.10 mole) of benzylmercaptan. While nitrogen is bubbled into the solution, 100 ml. of a 1 molar sodium ethoxide in ethanol solution is added. The solvent is evaporated and 100 ml. of anhydrous dimethylformamide is added to the crude solid sodium mercaptide. To the resulting solution is then The extracts are combined, dried over anhydrous sodium sulfate and evaporated to provide, after drying under high vacuum, a pale yellow oil that crystallizes to a solid upon standing. The yield of crude 2-benzylthio-5-trifluoromethylbenzonitrile is 27.4 g. (94%).

In about 15 ml. of ethanol is dissolved 17.5 g. (0.06 mole) of the crude 2-benzylthio-5-trifluoromethylbenzonitrile. To this solution is added 200 ml. of 20% sodium hydroxide solution.

The reaction mixture is refluxed for about 27 hours. After removing the major portion of the ethanol under reduced pressure, the residual oil present in the aqueous phase is extracted with three 200 ml.-portions of ether. After the ether extracts are combined and evaporated, the residual oil is suspended in about 500 ml. of water. This suspension is acidified with 6 N hydrochloric acid and the white solid that separates is filtered. The yield of 2 - benzylthio-5-trifluoromethylbenzoic acid is 15.7 g. (84%); M.P. 169–174° C. Upon recrystallization from benzene, the melting point is 180–181° C.

Neutralization equivalent: 315. Theoretical: 312.

EXAMPLE XXV

To 365 ml. of formic acid is added 11.5 g. (0.037 mole) of 2-benzylthio-5-trifluoromethylbenzoic acid. The mixture is stirred for 5 minutes at 57° C. on a water bath. To the mixture is added dropwise, 26.5 ml. of 30% hydrogen peroxide. After the addition is complete, the mixture is stirred an additional hour on the steam bath, keeping the temperature of the mixture at about 57° C.

The mixture is cooled and poured into 1000 ml. of ice water. After stirring thoroughly, the crude solid is filtered and triturated with 400 ml. of water. The 5-trifluoromethyl-2-benzylsulfonylbenzoic acid is filtered and dried. The yield is 9.2 g. (73%); M.P. 171–172.5° C.

EXAMPLE XXVI

To 65 ml. of anhydrous benzene is added 8.2 g. of 5-trifluoromethyl-2-benzylfonylbenzoic acid (0.024 mole) and 65 ml. of thionyl chloride. The clear yellow solution is refluxed on a steam bath for 1 hour and the solvent evaporated under reduced pressure.

The crude acid chloride is added to about 200 ml. of methanol and the mixture is refluxed for 1 hour. The solvent is removed under reduced pressure and the crude methyl ester is dissolved in 100 ml. of methanol. To this solution is added a solution of 5.2 g. of sodium methoxide (0.096 mole) in 100 ml. of methanol. The resultant solution is refluxed for 1 hour, after which the solvent is evaporated under reduced pressure.

The residue is dissolved in 300 ml. of water. The aqueous solution is filtered, cooled and acidified with 6 N hydrochloric acid. The white solid that precipitates is washed thoroughly with water and dried. The yield of 2-phenyl - 5 - trifluoromethylbenzo(b)thiophen-3(2H)-one-1-dioxide is 6.5 g. (83%); M.P. 198–200° C.

*Analysis.*—Calc'd for $C_{15}H_9F_3O_3S$ (percent): C, 55.3; H, 2.78. Found (percent): C, 55.56; H, 2.82.

EXAMPLE XXVII

Following the procedure of Example XXIII, 3-methylbenzylchloride is converted to 3-methylbenzylmercaptan with substantially the same results being obtained.

EXAMPLE XXVIII

Following substantially the same procedure as in Example XXIV, 3-methylbenzylmercaptan is reacted with 4-chloro-3-cyano-benzotrifluoride and the crude 2-(m-methylbenzylthio) - 5 - trifluoromethylbenzonitrile thus formed in quantitative yield is hydrolyzed, according to the procedure described in Example XXIV, to give 2-(m-methylbenzylthio) - 5 - trifluoromethylbenzoic acid, yield 80%, M.P. 192–195° C.

EXAMPLE XXIX

Following substantially the same procedure of Example XXV, 2-(m-methylbenzylthio)-5-trifluoromethyl benzoic acid is oxidized to 2-(m-methylbenzylsulfonyl)-5-trifluoromethyl benzoic acid. Yield 80%; M.P. 165–166° C.

EXAMPLE XXX

Following substantially the same procedure of Example XXVI, 2-(m-methylbenzylsulfonyl)-5-trifluoromethyl benzoic acid is converted to 2-m-tolyl-5-trifluoromethylbenzo(b)thiophen-3(2H)-one-1,1-dioxide in 90% yield; M.P. 174–176° C.

EXAMPLE XXXI

Following substantially the same procedure of Example XXIV, 4-chloro-3-cyano-benzotrifluroide is reacted with substituted-benzylmercaptans in Column A of Table XIII, to yield the corresponding benzylthio benzoic acids in Column B.

TABLE XIII

| A | B | C | D |
|---|---|---|---|
| 2-methylbenzylmercaptan | $2\text{-}CH_3C_6H_4\text{—}$ | $2\text{-}CH_3C_6H_4\text{—}$ | $2\text{-}CH_3C_6H_4\text{—}$ |
| 4-methylbenzylmercaptan | $4\text{-}CH_3C_6H_4\text{—}$ | $4\text{-}CH_3C_6H_4\text{—}$ | $4\text{-}CH_3C_6H_4\text{—}$ |
| 2-methoxybenzylmercaptan | $2\text{-}CH_3OC_6H_4\text{—}$ | $2\text{-}CH_3OC_6H_4\text{—}$ | $2\text{-}CH_3OC_6H_4\text{—}$ |
| 3-methoxybenzylmercaptan | $3\text{-}CH_3OC_6H_4\text{—}$ | $3\text{-}CH_3OC_6H_4\text{—}$ | $3\text{-}CH_3OC_6H_4\text{—}$ |
| 4-methoxybenzylmercaptan | $4\text{-}CH_3OC_6H_4\text{—}$ | $4\text{-}CH_3OC_6H_4\text{—}$ | $3\text{-}CH_3OC_6H_4\text{—}$ |
| 2-nitrobenzylmercaptan | $2\text{-}NO_2C_6H_4\text{—}$ | $2\text{-}NO_2C_6H_4\text{—}$ | $2\text{-}NO_2C_6H_4\text{—}$ |
| 4-nitrobenzylmercaptan | $4\text{-}NO_2C_6H_4\text{—}$ | $2\text{-}NO_2C_6H_4\text{—}$ | $2\text{-}NO_2C_6H_4\text{—}$ |
| 2-chlorobenzylmercaptan | $2\text{-}ClC_6H_4\text{—}$ | $2\text{-}ClC_6H_4\text{—}$ | $2\text{-}ClC_6H_4\text{—}$ |
| 3-chlorobenzylmercaptan | $3\text{-}ClC_6H_4\text{—}$ | $3\text{-}ClC_6H_4\text{—}$ | $3\text{-}ClC_6H_4\text{—}$ |
| 2-bromobenzylmercaptan | $2\text{-}BrC_6H_4\text{—}$ | $2\text{-}BrC_6H_4\text{—}$ | $2\text{-}BrC_6H_4\text{—}$ |
| 3-bromobenzylmercaptan | $3\text{-}BrC_6H_4\text{—}$ | $3\text{-}BrC_6H_4\text{—}$ | $3\text{-}BrC_6H_4\text{—}$ |
| 4-bromobenzylmercaptan | $4\text{-}BrC_6H_4\text{—}$ | $4\text{-}BrC_6H_4\text{—}$ | $4\text{-}BrC_6H_4\text{—}$ |
| 2-fluorobenzylmercaptan | $2\text{-}FC_6H_4\text{—}$ | $2\text{-}FC_6H_4\text{—}$ | $2\text{-}FC_6H_4\text{—}$ |
| 3-fluorobenzylmercaptan | $3\text{-}FC_6H_4\text{—}$ | $3\text{-}FC_6H_4\text{—}$ | $3\text{-}FC_6H_4\text{—}$ |
| 4-fluorobenzylmercaptan | $4\text{-}FC_6H_4\text{—}$ | $4\text{-}FC_6H_4\text{—}$ | $4\text{-}FC_6H_4\text{—}$ |
| α-Mercaptomethylnaphthalene | α-Naphthyl | α-Naphthyl | α-Naphthyl |
| β-Mercaptomethylnaphthalene | β-Naphthyl | β-Naphthyl | β-Naphthyl |

EXAMPLE XXXII

Following substantially the procedure of Example XXV, the benzylthiobenzoic acids in Column B of Table XIII are converted to the benzylsulfonylbenzoic acids in Column C with substantially the same results.

EXAMPLE XXXIII

Following the procedure of Example XXVI, the benzylsulfonylbenzoic acids of Column C of Table XIII are converted the benzo(b)thiophen-3(2H)-one-1,1-dioxides in Column D with substantially the same results.

EXAMPLE XXXIV

To 250 ml. of dimethylformamide, under nitrogen, are added 10.1 g. (0.05 mole) of 2-chloro-5-nitrobenzoic acid, 7.3 g. (0.05 mole) of m-methylbenzyl mercaptan, 150 mg. of copper powder and 6.6 g. of potassium hydroxide.

The resulting brown-yellow suspension is heated on an oil bath at 125° C. for about 16 hours. The reaction mixture is cooled and filtered. The filtrate is poured into about 500 ml. of cold 6 N HCl and the yellow precipitate that forms in filtered and washed with water. The yield is 10.3 g. (66%). This material is recrystallized from ethanol to provide 3.7 g. (36%) of 2-m-(methylbenzylthio)-5-nitrobenzoic acid; M.P. 238–240° C.

*Analysis.*—Calc'd for $C_{15}H_{13}NO_4S$ (percent): C, 59.2; H, 4.27; N, 4.58. Found (percent): C, 59.68; H, 4.49; N, 4.56.

EXAMPLE XXXV

Into 75 ml. of glacial acetic acid, under nitrogen, is added 3.7 g. (0.012 mole) of 2-(m-methylbenzylthio)-5-nitrobenzoic acid.

To this suspension is slowly added 5.4 g. (0.048 mole) of 30% hydrogen peroxide.

The mixture is heated at 60° C. for 5 hours and then added to 500 ml. of ice-water. Th heavy white precipitate is filtered and dried under high vacuum to yield 3.5 g. (87.5%) of 2-(m-methylbenzylsulfonyl)-5-nitrobenzoic acid; M.P. 244–246° C.

EXAMPLE XXXVI

To 70 ml. of acetic anhydride is added 0.10 g. of postassium acetate and 2.75 g. (0.0082 mole) of 2-m-(methylbenzylsulfonyl)-5-nitrobenzoic acid. The resultant mixture is refluxed for about 24 hours. The solvents are evaporated under reduced pressure and the residual enol acetate brown oil thus obtained crystallizes upon standing.

The crude product is suspended in about 25 ml. of water and 75 ml. of 10% sodium hydroxide is added. The mixture is filtered, and the filtrate is cooled and acidified with 6 N hydrochloric acid. The yellow precipitate is filtered and recrytsallized several times from ethanol-water. The yield of 5-nitro-2-(m-methylphenyl)-benzo(b)thiophen-3(2H)-one-1,1-dioxide is about 45%; M.P. 137–140° C.

*Analysis.*—Calc'd for $C_{15}H_{11}NO_5S$ (percent): C, 56.7; H, 3.49; N, 4.45. Found (percent): C, 57.4; H, 3.68; N, 4.99.

EXAMPLE XXXVII

Following the procedure of Example XXXIV, the benzylmercaptans listed in Column B of Table IV (R=—NO$_2$) are reacted with 2-chloro-5-nitrobenzoic acid to provide the compounds in Column C (R=—NO$_2$)

EXAMPLE XXXVIII

Following essentially the procedure of Example XXV, the compounds in Column C, of Table IV, (R=—NO$_2$) are converted, with substantially the same results to the corresponding products in Column D of Table IV (R=—NO$_2$).

EXAMPLE XXXIX

Following the procedure of Example XXXVI, the 2-benzylsulfonyl-5-nitrobenzoic acids listed in Column D of Table IV (R=—NO$_2$) are converted to the 5-nitro-2-phenylbenzo(b)thiophen-3(2H) - one - 1,1 - dioxides in Column E of Table IV (R=—NO$_2$).

What is claimed is:

1. A compound selected from the group consisting of those of the formulae

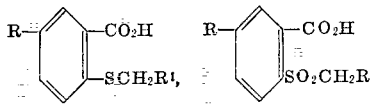

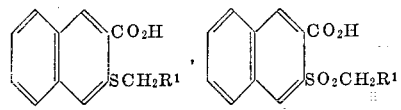

and

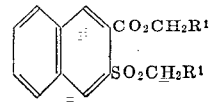

wherein R is a member selected from the group consisting of —CF$_3$, and —NO$_2$, and R$^1$ is a member selected from the group consisting of phenyl, tolyl, methoxyphenyl, nitrophenyl, halophenyl, trifluoromethylphenyl, trifluoromethyl - thiophenyl, trifluoromethylsulfinylphenyl, trifluoromethylsulfonylphenyl, and α- and β-naphthyl.

2. A compound selected from the group consisting of those of the formulae

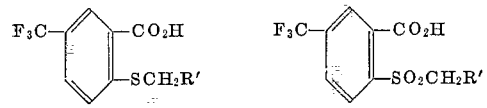

wherein R' is selected from the group consisting of phenyl, tolyl, methoxyphenyl, nitrophenyl, halophenyl, trifluoromethylphenyl, trifluoromethyl-thiophenyl, trifluoromethylsulfonylphenyl, trifluoromethylsulfonylphenyl, and α-, and β-naphthyl.

3.

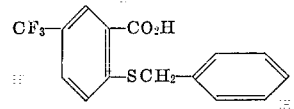

References Cited

Jucker et al.: Chem. Abstracts, V. 63, p. 2962e-f, 1965.

LORRAINE A. WEINBERGER, Primary Examiner

EDWARD JAY GLEIMAN, Assistant Examiner

U.S. Cl. X.R.

260—397.6; 470, 515, 520, 330.5; 424—275